United States Patent
Masuda et al.

(10) Patent No.: US 7,634,293 B2
(45) Date of Patent: Dec. 15, 2009

(54) MOBILE COMMUNICATION SYSTEM, EXTENSION TRANSMISSION/RECEPTION DEVICE, BASE STATION, RADIO NETWORK CONTROLLER AND MOBILE STATION

(75) Inventors: Masafumi Masuda, Yokosuka (JP); Akihiro Maebara, Yokohama (JP); Masayuki Koshino, Fujisawa (JP); Mayu Yamada, Mitaka (JP)

(73) Assignee: NTT DoCoMo, Inc., Tokyo (JP)

( * ) Notice: Subject to any disclaimer, the term of this patent is extended or adjusted under 35 U.S.C. 154(b) by 526 days.

(21) Appl. No.: 10/981,592

(22) Filed: Nov. 5, 2004

(65) Prior Publication Data

US 2005/0136950 A1    Jun. 23, 2005

(30) Foreign Application Priority Data

Nov. 7, 2003    (JP)    ............................. 2003-379044

(51) Int. Cl.
H04M 1/00    (2006.01)
(52) U.S. Cl. ..................... 455/552.1; 455/465; 455/420; 455/435.1; 455/435.2; 455/428; 455/462; 455/524; 455/560; 455/561
(58) Field of Classification Search ................. 455/465, 455/420, 435.1, 435.2, 428, 462, 552.1, 524, 455/560, 561
See application file for complete search history.

(56) References Cited

U.S. PATENT DOCUMENTS

| | | | | |
|---|---|---|---|---|
| 5,761,195 A | * | 6/1998 | Lu et al. ...................... | 370/329 |
| 6,141,531 A | * | 10/2000 | Williams et al. ................ | 455/7 |
| 6,594,489 B2 | * | 7/2003 | Holcman .................. | 455/432.1 |
| 6,731,621 B1 | * | 5/2004 | Mizutani et al. ............. | 370/338 |
| 6,961,573 B1 | * | 11/2005 | Moon et al. .................. | 455/445 |
| 7,010,302 B1 | * | 3/2006 | Nakajima et al. ........... | 455/445 |
| 7,146,186 B1 | * | 12/2006 | Moon et al. ............... | 455/552.1 |
| 7,257,404 B1 | * | 8/2007 | Chow et al. .................. | 455/436 |
| 7,266,393 B2 | * | 9/2007 | Latva-Aho et al. .......... | 455/561 |
| 7,486,966 B2 | * | 2/2009 | Sayers et al. ................. | 455/555 |
| 2001/0046839 A1 | * | 11/2001 | Latva-Aho et al. ......... | 455/3.05 |
| 2003/0214929 A1 | * | 11/2003 | Bichot et al. ................ | 370/338 |
| 2004/0005886 A1 | * | 1/2004 | Oda et al. ................. | 455/422.1 |

(Continued)

FOREIGN PATENT DOCUMENTS

CN    1318929 A    10/2001

(Continued)

OTHER PUBLICATIONS

Takeshi Hattori, et al., "Wireless Broadband Textbook", IDG Japan Co., Ltd, Jun. 10, 2002, pp. 26-37, (with English translation).

Primary Examiner—Duc Nguyen
Assistant Examiner—Amar Daglawi
(74) Attorney, Agent, or Firm—Oblon, Spivak, McClelland, Maier & Neustadt, L.L.P.

(57) ABSTRACT

A mobile communication system includes a first base station configured to be controlled by a first radio network controller, and provide an address of an extension transmission/reception device to user data received from a first mobile station, and the extension transmission/reception device configured to be controlled by the first radio network controller or a different second radio network controller, and provide an address of a second base station, which is controlled by the second radio network controller, to user data received from the first base station.

7 Claims, 9 Drawing Sheets

U.S. PATENT DOCUMENTS

| | | | |
|---|---|---|---|
| 2004/0029615 A1* | 2/2004 | Gerry et al. | 455/560 |
| 2004/0071126 A1* | 4/2004 | Ramos-Escano et al. | 370/349 |
| 2004/0176135 A1* | 9/2004 | Palkisto | 455/560 |
| 2004/0203736 A1* | 10/2004 | Serna | 455/426.1 |
| 2004/0248615 A1* | 12/2004 | Purkayastha et al. | 455/552.1 |
| 2004/0260796 A1* | 12/2004 | Sundqvist et al. | 709/223 |
| 2005/0014498 A1* | 1/2005 | Yamada et al. | 455/428 |
| 2005/0064889 A1* | 3/2005 | Haumont | 455/514 |
| 2005/0079869 A1* | 4/2005 | Khalil et al. | 455/435.1 |
| 2005/0090262 A1* | 4/2005 | Hamano et al. | 455/445 |
| 2005/0141471 A1* | 6/2005 | Virtanen et al. | 370/342 |
| 2006/0211447 A1* | 9/2006 | Purkayastha et al. | 455/552.1 |
| 2006/0258353 A1* | 11/2006 | Makela et al. | 455/435.2 |

FOREIGN PATENT DOCUMENTS

| | | |
|---|---|---|
| DE | 100 52 931 A1 | 5/2002 |
| EP | 1 107 621 A2 | 6/2001 |
| EP | 1 107 621 A2 * | 6/2001 |
| JP | 2000-83273 | 3/2000 |
| JP | 2004-364054 | 12/2004 |
| WO | WO 02/98154 A1 * | 5/2002 |
| WO | WO 02/098154 A1 | 12/2002 |
| WO | WO 02098154 A1 * | 12/2002 |

* cited by examiner

| BS NAME | NAME OF RNC CONTROLLING BS |
|---|---|
| BS01 | RNC01 |
| BS02 | RNC02 |
| ⋮ | ⋮ |

65

| RNC NAME | NAME OF EXTENSION TRANSMISSION /RECEPTION SERVER UNDER RNC CONTROL | EXTENSION TRANSMISSION /RECEPTION SERVER IP ADDRESS |
|---|---|---|
| RNC01 | EXTENSION TRANSMISSION /RECEPTION SERVER 01 | 255.255.255.1 |
| RNC02 | EXTENSION TRANSMISSION /RECEPTION SERVER 02 | 255.255.255.2 |
| RNC03 | — | — |
| ⋮ | ⋮ | ⋮ |

65

MOBILE COMMUNICATION SYSTEM, EXTENSION TRANSMISSION/RECEPTION DEVICE, BASE STATION, RADIO NETWORK CONTROLLER AND MOBILE STATION

CROSS REFERENCE TO RELATED APPLICATIONS

This application is based upon and claims the benefit of priority from the prior Japanese Patent Application No. 2003-379044, filed on Nov. 7, 2003; the entire contents of which are incorporated herein by reference.

BACKGROUND OF THE INVENTION

1. Field of the Invention

The present invention relates to a mobile communication system, an extension transmission/reception device, a base station, a radio network controller and a mobile station.

2. Description of the Related Art

A conventional mobile communication system 400, as shown in FIG. 1, consits of a plurality of MSs (mobile stations) 410a and 410b, which connect to a plurality of BSs (base stations) 420a and 420b, a radio access network 450 and a core network 480, conforming to the 3GPP (Third Generation Partnership Project). The radio access network 450 consists of a plurality of RNCs (radio network controllers) 440a and 440b and the plurality of BSs 420a and 420b, which connect to the RNCs 440a and 440b. The core network 480 consists of an MSC (mobile switching center) 460, which connects to the RNCs 440a and 440b, and an HLR (home location register) 470, which connects to the MSC 460 ("Textbook for wireless broadband", under editorship of Takeshi Hattori and Masanobu Fujioka, IDG Japan Inc., Jun. 10, 2002; pp. 26-37).

In the mobile communication system 400, the communication is carried out in the procedure shown in FIG. 2. FIG. 2 shows a case where the MS 410a, in the radio communication zone of the BS 420a, is a communication source; and the MS 410b is a communication destination. To start communications, the MS 410a connects and transmits a call request to the RNC 440a via the BS 420a (S401). The RNC 440a inquires the MSC 460 whether or not the connection to the communication destination MS 410b is available (S402). The MSC 460 retrieves the HLR 470, and obtains the MS 410b information from the HLR 470 (S403).

Based on the obtained the MS 410b information, the MSC 460 determines whether or not the RNC 440a can connect to the communication destination MS 410b via the BS 420b, the RNC 440b and the MSC 460 to which the MS 410b connects. When it is determined as connectable, the MSC 460 instructs the RNC 440a to connect to the MS 410b (S404). Also, the MSC 460 calls the MS 410b and receives a call response from the MS 410b (S405).

When the instruction is received, the RNC 440a connects to the BS 420a (S406). The MS 410a transmits user data for the MS 410b to the BS 420a; thus the communication is started (S407). Accordingly, as shown in FIG. 3, in the mobile communication system 400, a path C fot the user data transmission always goes through the MSC 460. That is, in the mobile communication system 400, every call is processed via the MSC 460.

Therefore, even when the communication destination MS and the communication source MS exist under the control of the same BS, the user data has to be transmitted through such redundant path via the MSC. Therefore, many lines are required; and line use fee for the paths that go via the MSC and delay due to those paths are occured. Ordinarily, in many cases, in order to integrate the functions, the RNC and the MSC are located in a place away from the BS. In such cases, those problems are offen arised.

To cope with the above problem, the following technique has been proposed. That is, MSCs, which have, in the functions of the conventional MSC, a function to process the communication with the MS's existing under the control of one BS or a small number of BSs, are distributed in places near these BSs (hereinafter, referred to as "distribution MSCs"). In this case, in a hierarchy higher than the distribution MSCs, a MSC, which has the function of the conventional MSC, is provided (hereinafter, referred to as "integration MSC"). Owing to this, when both of the communication source MS and communication destination MS exist under the control of the same distribution MSC, the path for the user data can be reduced. Accordingly, in this case, the line use fee for the path via the MSC, which is counted when only the conventional MSC is available, can be reduced, and the delay due to the path can be reduced.

BRIEF SUMMARY OF THE INVENTION

However, even when the distribution MSCs are provided, when a communication is carried out between the MSs, which are controlled by the different distribution MSCs, the user data have to use a redundant path, which goes through the integration MSC. In this case, as a result, many lines are required for the paths by using the integration MSC. Accordingly, the line use fee for the paths is counted; and the delay due to the paths is resulted in. Further, when distribution MSCs are provided, both of the distribution MSCs and the integration MSC must possess a function to process the communication between the MSs. Accordingly, the functions of the mobile communication system become redundant. Furthermore, the integration effect to integrally process the control data, which the MSC originally possesses, impairs. Accordingly, an object of the present invention is to shorten the path for the user data.

To achieve the object, a first aspect of the present invention is to provide a mobile communication system, which contains: a) a first base station configured to be controlled by a first radio network controller, and provide an address of an extension transmission/reception device to user data received from a first mobile station; and b) the extension transmission/reception device configured to be controlled by the first radio network controller or a different second radio network controller, and provide an address of a second base station, which is controlled by the second radio network controller, to user data received from the first base station.

Here the "extension transmission/reception device" indicates, for example, an extension transmission/reception server, however, a base station, a radio network controller and other devices, which have functions of the extension transmission/reception device, may be included. Further, "provide an address" may include to encapsulate packet data by using destination address, or to generate an IP header including a destination address when sound data is generated to packet data.

According to the mobile communication system of the first aspect, one of the plurality of extension transmission/reception devices processes, so that the delay of transmitting the user data can be reduced, and that the processing load of other extension transmission/reception servers can be reduced. Also, the cost for extension server for those functions can be reduced.

A second aspect of the present invention is to provide a mobile communication system, which contains: a) a first extension transmission/reception device configured to be controlled by a first radio network controller; b) a second extension transmission/reception device configured to be controlled by a different second radio network controller; and c) a base station configured to be controlled by the first radio network controller, and provide an address of one of the first extension transmission/reception device or the second extension transmission/reception device, which is selected by a mobile switching center, to user data received from a first mobile station. Here, the selected extension transmission/reception device provides an address of a second base station, which is controlled by the second radio network controller, to user data received from the base station.

According to this mobile communication system, the mobile switching center can select a single extension transmission/reception device.

Further, in the mobile communication system according to the first aspect, the extension transmission/reception device may convert a format of user data, which is transmitted by the first mobile station, to a format of user data to be received by a second mobile station when the format of user data transmitted by the first mobile station is different from the format of user data received by the second mobile station.

According to the mobile communication system, different data format can be used for the data transmitted between a mobile station and a base station in communication resource, and for the data transmitted between a mobile station and a base station in communication destination, so that the data can be kept confidential. The process to keep the data confidential can be implemented in a single extension transmission/reception server, so the processing load of other extension transmission/reception servers can be reduced. Also, the cost for those functions of the extension servers can be reduced.

In the mobile communication system according to the first aspect, data transmission and data reception among the first mobile station, the first base station, the second base station, the extension transmission/reception device and a mobile switching center may be implemented by connectionless communication.

According to this mobile communication system, a mobile communication system can be easily constructed and extended. Further, when a trouble occurs on the communication path or device itself, the mobile communication system 100 can make detour the troubled portion easily resulting in an increased reliability.

A third aspect of the present invention is to provide a mobile communication system, which contains: a) a first radio network controller configured to establish a first radio access network, and provide an address of a second extension transmission/reception device controlled by a second radio network controller, which establishes a different second radio access network; b) and the second extension transmission/reception device configured to receive extension transmission/reception control data.

According to the mobile communication system of the third aspect, the radio network controller can control the extension transmission/reception device based on the extension transmission/reception control data.

A fourth aspect of the present invention is to provide a mobile communication system, which contains: a) a first radio network controller configured to establish a first radio access network, and provide an address of a second radio network controller, which establishes a different second radio access network, to extension transmission/reception control data; and b) a second extension transmission/reception device configured to be controlled by the second radio network controller, and receive the extension transmission/reception control data via the second radio network controller.

According to the mobile communication system of the fourth aspect, the radio network controller transmits the extension transmission/reception control data directly to the extension transmission/reception server, so that the shortening of the extension transmission/reception control data path and reduction of connection fees can be achieved.

A fifth aspect of the present invention is to provide an extension transmission/reception device, which contains a user data process unit configured to provide an address of a second base station controlled by a different second radio network controller to user data received from a first base station controlled by a first radio network controller. Here, the extension transmission/reception device is controlled by the first radio network controller or the second radio network controller.

According to the extension transmission/reception device of the fifth aspect, one of the plurality of extension transmission/reception devices processes, so that the transmission delay can be shortened and that the processing load of other extension transmission/reception servers can be reduced. Also as a result of those, the cost can be reduced.

The extension transmission/reception device of the fifth aspect may further contains a data converter configured to convert a format of user data, which is transmitted by the first mobile station, to a format of user data to be received by a second mobile station when the format of user data transmitted by the first mobile station is different from the format of user data received by the second mobile station.

Here, the "data converter" indicates, for example, a user data process unit of an extension transmission/reception server. According to the extension transmission/reception device, different data format can be used for the data transmitted between a mobile station and base station in communication resource, and for the data transmitted between a mobile station and a base station in communication destination, so that the data can be kept confidential. The process to keep the data confidential can be implemented in a single extension transmission/reception server, so that the processing load of other extension transmission/reception servers can be reduced. Also, the cost for those functions of the extension servers can be reduced.

A sixth aspect of the present invention is to provide a base station, which contains a user data process unit configured to provide an address of a second base station, which is controlled by a different second radio network controller, to user data received from a mobile station.

The base station of the sixth aspect has a function of extension transmission/reception device described above, so that, without providing an extension transmission/reception device, the delay of transmission of user data can be shortened, and that the processing load of other extension transmission/reception servers can be reduced. Also, the cost for those functions of the extension servers can be reduced.

A seventh aspect of the present invention is to provide a radio access network, which contains a user data process unit configured to provide an address of a second base station, which is controlled by a different second radio network controller, to user data received from a mobile station via a first base station controlled by the radio network controller.

The radio network controller of the seventh aspect is adapted for the functions of the extension transmission/reception device described above, so that, without providing an extension transmission/reception device, the delay of transmission of user data can be shortened, and that the processing load of other extension transmission/reception servers can be reduced. Also, the cost for those functions of the extension servers can be reduced.

An eighth aspect of the present invention is to provide a mobile switching center, which contains an extension transmission/reception device selection unit configured to select one of a first extension transmission/reception device controlled by a first radio network controller or a second extension transmission/reception device controlled by a second radio network controller, as an extension transmission/reception device to provide an address of a second base station, which is controlled by the different second radio network controller, to user data received from a first base station.

Here, the "extension transmission/reception device selection unit" indicates, for example, an extension transmission/reception determination unit of a mobile switching center.

According to the mobile switching center of the eighth aspect, the most preferable extension transmission/reception device can be selected based on the traffic load and the process capacity of the extension transmission/reception devices.

The present invention provides a mobile communication system, an extension transmission/reception device, a base station, a radio network controller, and a mobile switching center, which are adapted for shortening of user data transmission delay, reduction of processing load of extension transmission/reception servers, and cost reduction.

DETAILED DESCRIPTION OF THE INVENTION

Figure 1:
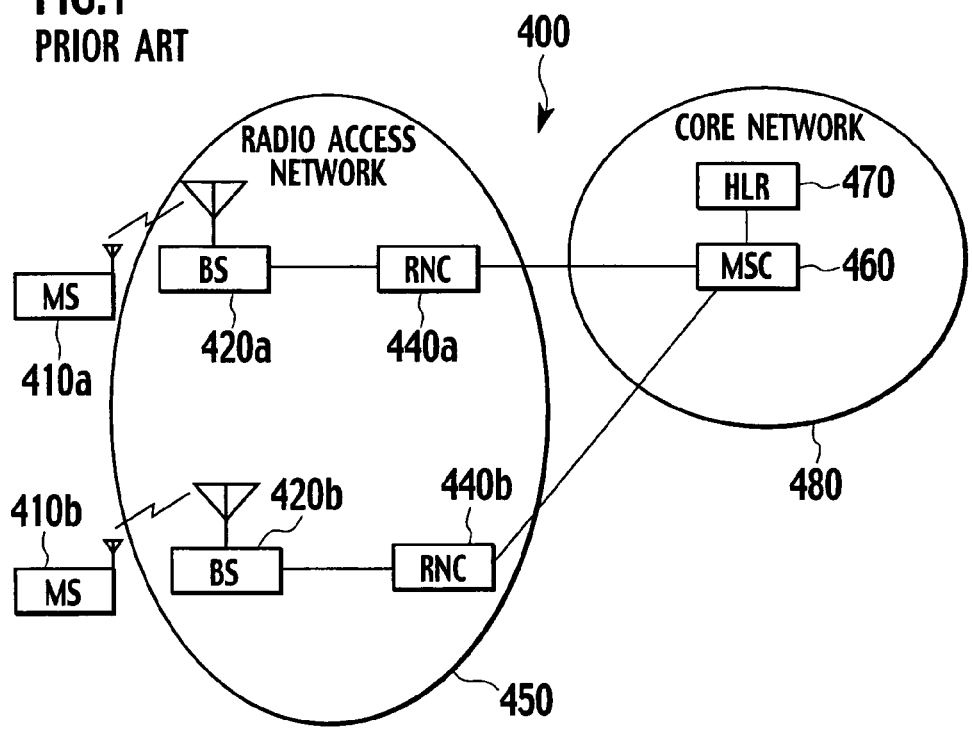
FIG. 1 is a view showing configuration of a conventional mobile communication system.
Figure 2:
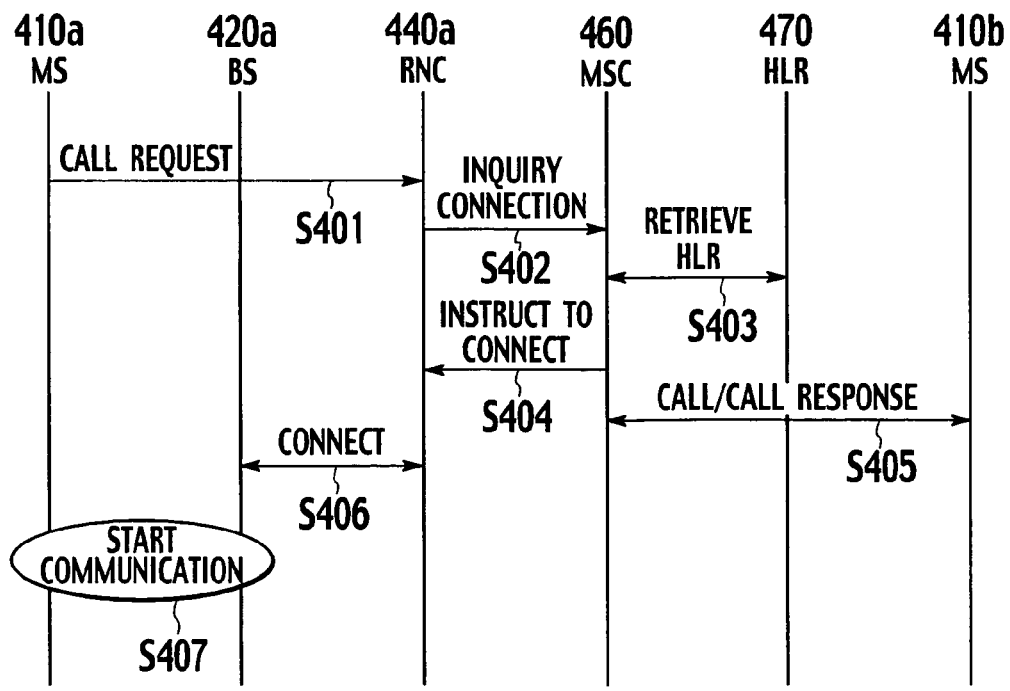
FIG. 2 is a flow chart showing a procedure of a conventional communication method.
Figure 3:
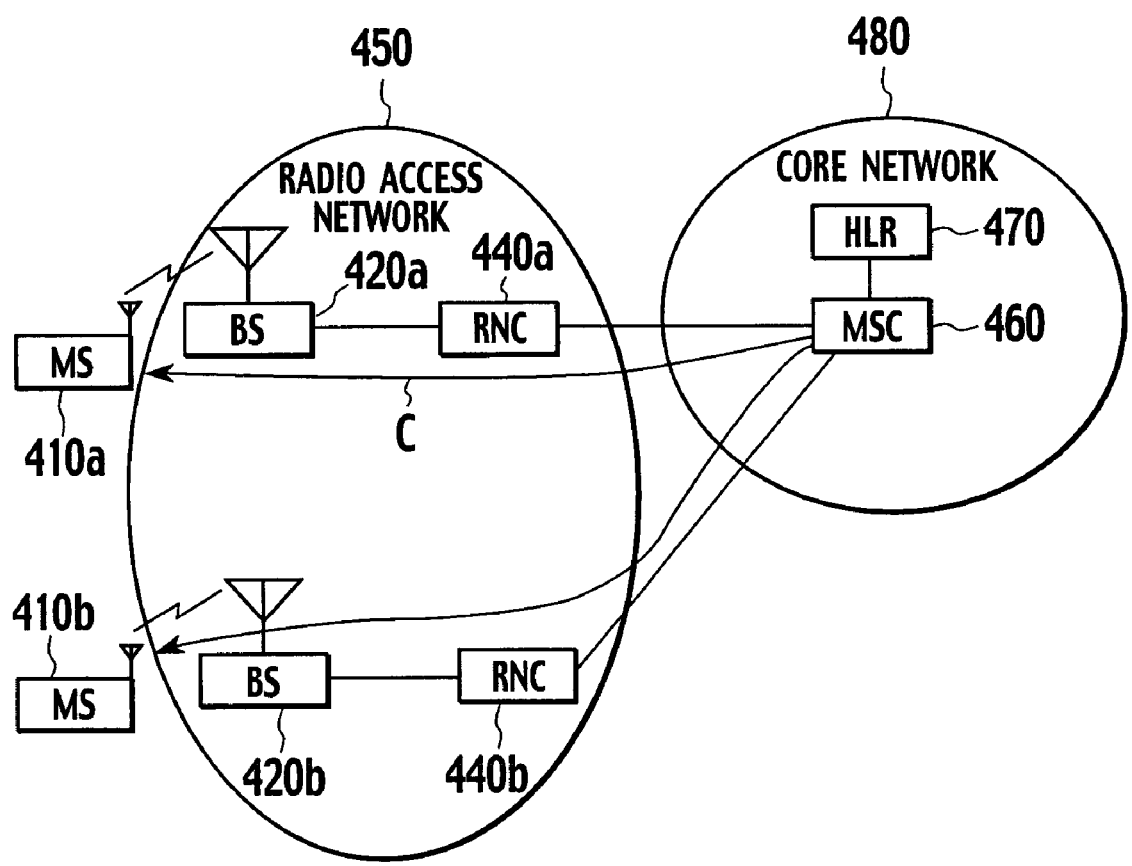
FIG. 3 is a view showing conventional paths for user data transmission.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Mobile Communication System)

Figure 4:
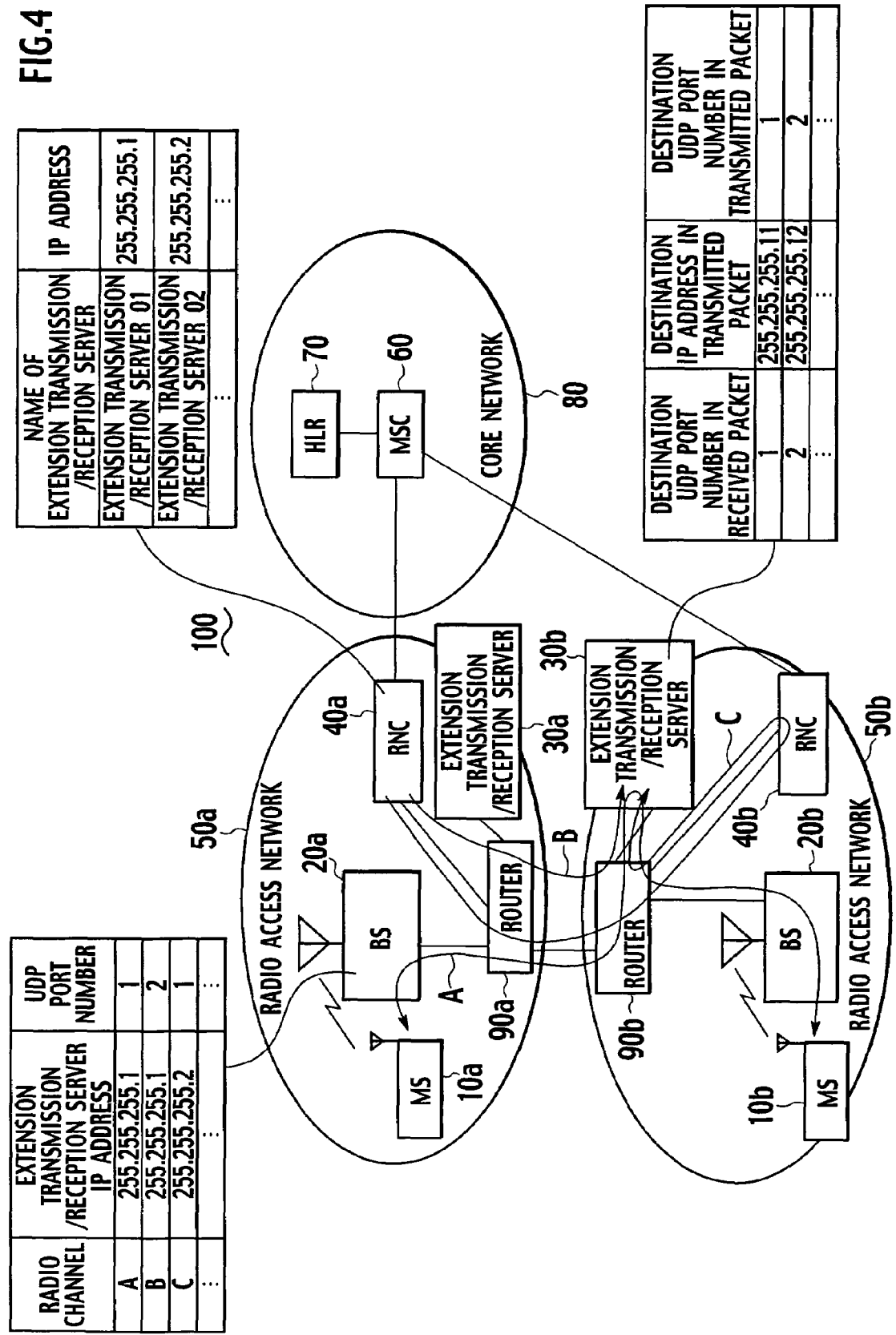
FIG. 4 is a view showing configuration of a mobile communication system in accordance with an embodiment of the present invention.

A mobile communication system 100 according to an embodiment of the invention is adapted, as shown in FIG. 4, for an extended transmission/reception of user data between radio access networks 50a and 50b, in which the transmission/reception of user data between an MS 10a within a coverage of one radio access network 50a and an MS 10b within a coverage of the other radio access network 50b are effected by use of a single extension transmission/reception server 30b, without detour communications via an MSC 60 located outside a radio access network 50.

The mobile communication system 100 includes MSs 10a and 10b, radio access networks 50a and 50b conforming to the 3GPP, and a core network 80. In the mobile communication system 100, a plurality of radio access networks 250a and 250b form a radio access network. The radio access network 50a has its BS 20a, extension transmission/reception server 30a, and RNC 40a. The radio access network 50b has its BS 20b, extension transmission/reception server 30b, and RNC 40b. The core network 80 has the MSC 60 and an HLR 70. The radio access networks 50a and 50b are connected via routers 90a and 90b.

The MSs 10a and 10b are adapted as mobile stations for radio communications with radio base stations for radio data transmission/reception therbetween. The MSs 10a and 10b connect to the BSs 20a and 20b via radio communucations, and are controlled by those BSs 20a and 20b respectively. The MSs 10a and 10b transmit/receive user data and control data to/from the BSs 20a and 20b respectively. A plurality of MSs may connect to a single BS. Further, each of the MSs 10a and 10b may be adapted for both data transmission and data reception, or for one of those transmission or reception only.

The radio access network 50 relays data between the core network 80, which has its MSC 60, and the MSs 10a and 10b. The radio access network 50 uses the RNC 40a and 40b to relay data transmitted between the core network 80 and the MSs 10a and 10b.

The BSs 20a and 20b are adapted as radio base stations for radio communications. The BSs 20a and 20b connect to the MSs 10a and 10b respectively via radio communications. Also, the BSs 20a and 20b connect to the RNCs 40a and 40b respectively. Further, the BSs 20a and 20b connect to the extension transmission/reception servers 30a and 30b. The BSs 20a and 20b transmit/receive user data and control data to/from the MSs 10a, 10b and the RNCs 40a, 40b. The control data includes mobile station control data, which is transmitted/received between the MSs 10a and 10b, and control data concerning the extension transmission/reception (hereinafter, referred to as "extension transmission/reception control data"). The BSs 20a and 20b transmit/receive user data to/from the extension transmission/reception servers 30. A plurality of BSs may be provided to a single RNC. Also, a plurality of extension transmission/reception servers may connect to a single BS.

Figure 5:
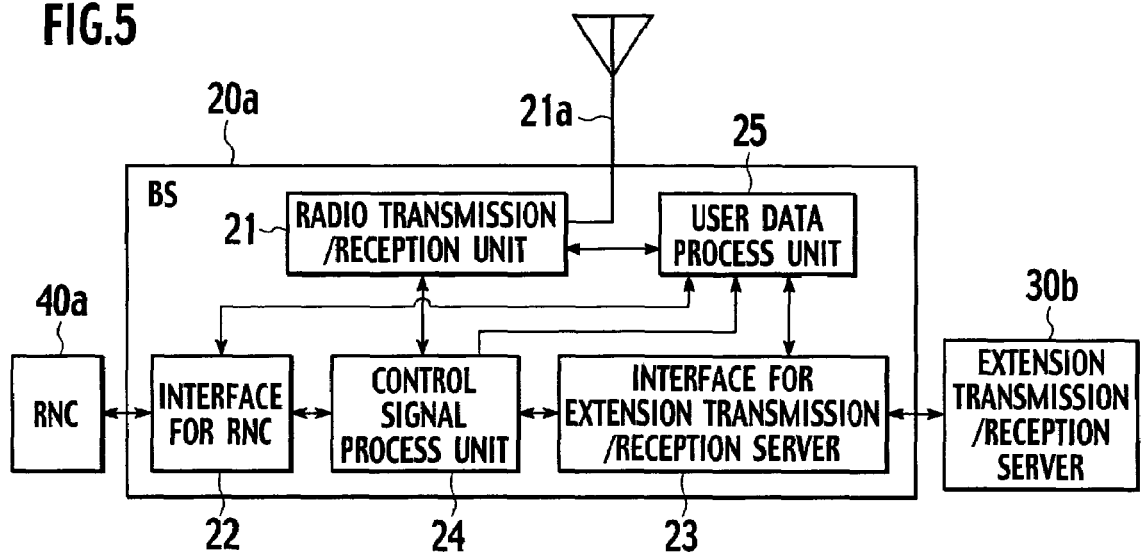
FIG. 5 is a block diagram showing configuration of a base station in accordance with the embodiment of the present invention.

As shown in FIG. 5, the BS 20a has its radio transmission/reception unit 21, interface for RNC 22, interface for extension transmission/reception server 23, control signal process unit 24, and user data process unit 25. The radio transmission/reception unit 21 is adapted for transmission/reception of user data and mobile station control data to/from the MS 10a via radio communications. The radio transmission/reception unit 21 connects to antenna 21a and perform radio communication with the MS 10a via the antenna 21a. The interface for RNC 22 transmits/receives user data and control data to/from the RNC 40a. The interface for RNC 22 functions as a control data transmission/reception unit, which transmits/receives mobile station control data to be transmitted/received between the MSs 10a and 10b via the MSC 60. The interface for extension transmission/reception server 23 is a user data transmission/reception unit, which transmits/receives the user data to/from the extension transmission/reception server 30b by using the extension transmission/reception, which transmits/receives the data within the radio access network 50 or between different radio access networks 50.

The control signal process unit 24 processes the control data, which is transmitted/received among the radio transmission/reception unit 21, the interface for RNC 22, and the interface for extension transmission/reception server 23. Specifically, the control signal process unit 24 obtains mobile station control data, which is received by the radio transmission/reception unit 21, from the radio transmission/reception unit 21, and inputs the data to the interface for RNC 22. The control signal process unit 24 obtains the mobile station control data, which is received by the interface for RNC 22, form the interface for RNC 22, and inputs the data to the radio transmission/reception unit 21.

Further, the control signal process unit 24 obtains extension transmission/reception control data, which is received by the interface for RNC 22 and the interface for extension transmission/reception server 23, from the interface for RNC 22 and the interface for extension transmission/reception server 23. The control signal process unit 24 controls the user data process unit 25 based on the obtained extension transmission/reception control data. The extension transmission/reception control data includes, for example, a notification of implementation of the user data transmission/reception by the extension transmission/reception, a notification of IP address of the extension transmission/reception server 30b, which is used for extension transmission/reception, information for determining whether or not the user data is transmitted/received by the extension transmission/reception (hereinafter, referred to as "determination information") and a request for determination information. Accordingly, for example, the control signal process unit 24 gives an instruction to the user data process unit 25 to transmit/receive the user data by extension transmission/reception via the extension transmission/reception server 30b, which has the notified IP addresses. Further, the control signal process unit 24 generates extension transmission/reception control data and inputs the data to the interface for RNC 22 and the interface for extension transmission/reception server 23.

The user data process unit 25 processes the user data, which is transmitted/received between the radio transmission/reception unit 21 and the interface for extension transmission/reception server 23. Specifically, the user data process unit 25 obtains the user data, which is received by the radio transmission/reception unit 21, from the radio transmission/reception unit 21. In accordance with the control of the control signal process unit 24, the user data process unit 25 inputs the obtained user data to either the interface for RNC 22 or the interface for extension transmission/reception server 23.

When receiving an instruction to start the transmission/reception by extension transmission/reception from the control signal process unit 24, firstly, the user data process unit 25 encapsulates the user data with the notified IP address of the extension transmission/reception server 30b. Then, the user data process unit 25 inputs the user data to the interface for extension transmission/reception server 23. The BS 20a, as shown in FIG. 4, has a table, which shows relations of allocated radio channels, IP addresses of the extension transmission/reception server, and UDP port numbers. For example, when the MS 10a connects to the BS 20a via radio channel C, the user data, which is given the extension transmission/reception server IP address of 255.255.255.2, is transmitted. The UDP port number becomes 1 and the BS 20a controls the session with combinations of the IP address and the UDP port number.

On the other hand, when the user data process unit 25 does not receive any instruction for the transmission/reception by the extension transmission/reception from the control signal process unit 24, the user data process unit 25 inputs the user data to the interface for RNC 22.

As described above, the control signal process unit 24 and the user data process unit 25 function as a transmission control unit, which controls data transmission carried out by the interface for extension transmission/reception server 23 and the interface for RNC 22 based on the data received from the MS 10a. That is, when the data received by the radio transmission/reception unit 21 is mobile station control data, the data is input to the interface for RNC 22; and when the data received by the radio transmission/reception unit 21 is user data, the data is input to the interface for extension transmission/reception server 23 based on the notification of implementation of the transmission/reception of the user data by the extension transmission/reception.

Further, the user data process unit 25 obtains user data, which is received by the interface for RNC 22 or the interface for extension transmission/reception server 23, from the interface for RNC 22 or the interface for extension transmission/reception server 23, and inputs the data to the radio transmission/reception unit 21. The BS 20b also has the same configuration as that of the BS 20a. In the case of the BS 20b, the radio transmission/reception unit 21 transmits/receives user data and control data to/from the MS 10b. Also, the interface for RNC 22 transmits/receives user data and control data to/from the RNC 40b.

The extension transmission/reception server 30a and 30b are extension transmission/reception servers adapted for transmission/reception of user data, which is transmitted/received between the MSs 10a and 10b, to/from the BSs 20a and 20b by the extension transmission/reception, which transmits/receives data between the radio access networks 50a and 50b. The extension transmission/reception servers 30a and 30b, as shown in FIG. 4, connect to the BSs 20a, 20b and RNCs 40a, 40b respectively. The extension transmission/reception servers 30a and 30b transmit/receive user data and extension transmission/reception control data to/from the BSs 20a and 20b. The extension transmission/reception servers 30 transmit/receive extension transmission/reception control data to/from the RNCs 40a and 40b.

In the embodiment of the present invention, user data is transmitted/received by using a single extension transmission/reception server when extension transmission/reception is performed. That is, the MSC 60 selects a single extension transmission/reception server among the extension transmission/reception servers provided in the radio access networks 50*a* and 50*b*, and the selected extension transmission/reception server transmits/receives user data. As shown in FIG. 4, when user data is transmitted/received by the extension transmission/reception server 30*b*, the user data is transmitted/received via the path A, which goes through a MS 10*a*, a BS 20*a*, a router 90*a*, a router 90*b*, the extension transmission/reception server 30*b*, the BS 20*b* and the MS 10*b*, without using the extension transmission/reception server 30*a*.

Figure 6:
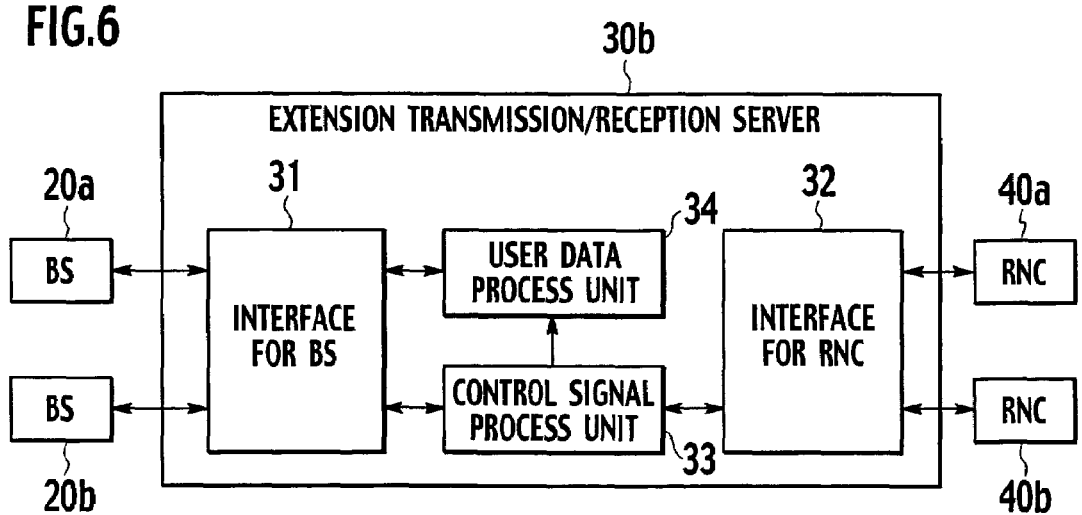
FIG. 6 is a block diagram showing configuration of an extension transmission/reception server in accordance with the embodiment of the present invention.

As shown in FIG. 6, the extension transmission/reception server 30*b* has an interface for BS 31, an interface for RNC 32, a control signal process unit 33 and a user data process unit 34. The interface for BS 31 is a base station transmission/reception unit adapted for transmission/reception of user data, which is transmitted/received between the MSs 10*a* and 10*b*, to/from the BSs 20*a* and 20*b* by extension transmission/reception, which transmits/receives user data within the radio access network 50, or between different radio access networks 50. The interface for BS 31 transmits/receives user data and extension transmission/reception control data to/from the BSs 20*a* and 20*b*. The interface for RNC 32 transmits/receives extension transmission/reception control data to/from the RNCs 40*a* and 40*b*.

The control signal process unit 33 processes extension transmission/reception control data, which is transmitted/received by the interface for BS 31 and the interface for RNC 32. For example, the control signal process unit 33 obtains extension transmission/reception control data, which is received by the interface for RNC 32, from the interface for RNC 32. Based on the obtained extension transmission/reception control data, the control signal process unit 33 controls the user data process unit 34. For example, when obtaining a notification of implementation of the transmission/reception by extension transmission/reception with respect to the user data transmitted/received between the MSs 10*a* and 10*b*, the control signal process unit 33 gives the following instruction to the user data process unit 34. That is, the user data received from the BS 20*a* connecting to the MS 10*a*, of which communication source is the MS 10*a* and the communication destination is the MS 10*b*, is transmitted to the BS 20*b* connecting to the MS 10*b*. Also, control signal process unit 33 gives the following instruction to the user data process unit 34. That is, the user data received from the BS 20*b* connecting to the MS 10*b*, of which communication source is the MS 10*b* and communication destination is the MS 10*a*, is transmitted to the BS 20*a* connecting to the MS 10*a*. Thus, the control signal process unit 33 gives an instruction to the user data process unit 34 to transmit/receive the user data by extension transmission/reception. Also, the control signal process unit 33 generates extension transmission/reception control data and inputs the data to the interface for BS 31 and the interface for RNC 32.

The user data process unit 34 controls transmission/reception of the user data, which is carried out by the interface for BS 31. In accordance with the control of the control signal process unit 33, the user data process unit 34 gives the following instruction to the interface for BS 31. That is, the user data received from the BSs 20*a* and 20*b* connecting to the communication sources MSs 10*a* and 10*b*, is transmitted to the BS 20*b* and 20*a* connecting to the communication destinations MS 10*b* and 10*a*. Specifically, the user data process unit 34 obtains the received user data from the interface for BS 31.

The user data process unit 34 obtains a destination identifier, which is included in header of a received packet. The destination identifier includes, for example, destination UDP port number in the received address, IP addresses of the BSs 20*a* and 20*b*, IP addresses of the MSs 10*a* and 10*b*, user ID of a user who is using the MSs 10*a* and 10*b*, mobile station ID, and the like.

The user data process unit 34 determines a BS for transmission of the received user data, based on the obtained destination identifier and the instruction from the control signal process unit 33. The user data process unit 34 converts the header of the received packet based on the determination result and inputs the data to the interface for BS 31. Specifically, as shown in FIG. 4, the extension transmission/reception server 30*b* has a table, which shows the relations between destination UDP port numbers of received packets, destination IP addresses included in the received packets, and destination UDP port numbers included in transmission packets. For example, when the UDP port number included in header of the received packet is "1", the header of the received packet is converted in use of the destination IP address "255.255.255.11" (IP address of the BS 20*b* in FIG. 4) and the destination UDP port number "1", by referring to the table.

Further, to keep the data confidential, different data formats may be used for user data transmitted from the communication source MS 10*a*, and for the user data to be transmitted to the communication destination MS 10*b*. Here, the user data process unit 34 converts the format of user data transmitted from the communication source MS 10*a*, to the format of user data to be relevant to the communication destination MS 10*b*.

The RNCs 40*a* and 40*b* are radio network controllers, which control radio communications between the MSs 10*a*, 10*b* and the BSs 20*a*, 20*b*. As shown in FIG. 4, the RNCs 40*a* and 40*b* connect to the extension transmission/reception servers 30*a*, 30*b*, and the MSC 60. The RNCs 40*a* and 40*b* connect to the BSs 20*a* and 20*b* respectively. The RNCs 40*a* and 40*b* transmit/receive user data and control data to/from the MSC 60 and the BSs 20*a*, 20*b*. Further, the RNCs 40*a* and 40*b* transmit/receive extension transmission/reception control data to/form the extension transmission/reception servers 30*a* and 30*b*. That is, the RNC 40*a* can exchange extension transmission/reception control data with the extension transmission/reception server 30*b*, which is not in the radio access network 50*a* controlled by the RNC 40*a*. In this case, the RNC 40*a* can transmit extension transmission/reception control data directly to the extension transmission/reception server 30*b* (the path B in FIG. 4), or can transmit via the RNC 40*b* (the path C in FIG. 4). Further, a number of RNCs may be provided to a single MSC 60.

Figure 7:
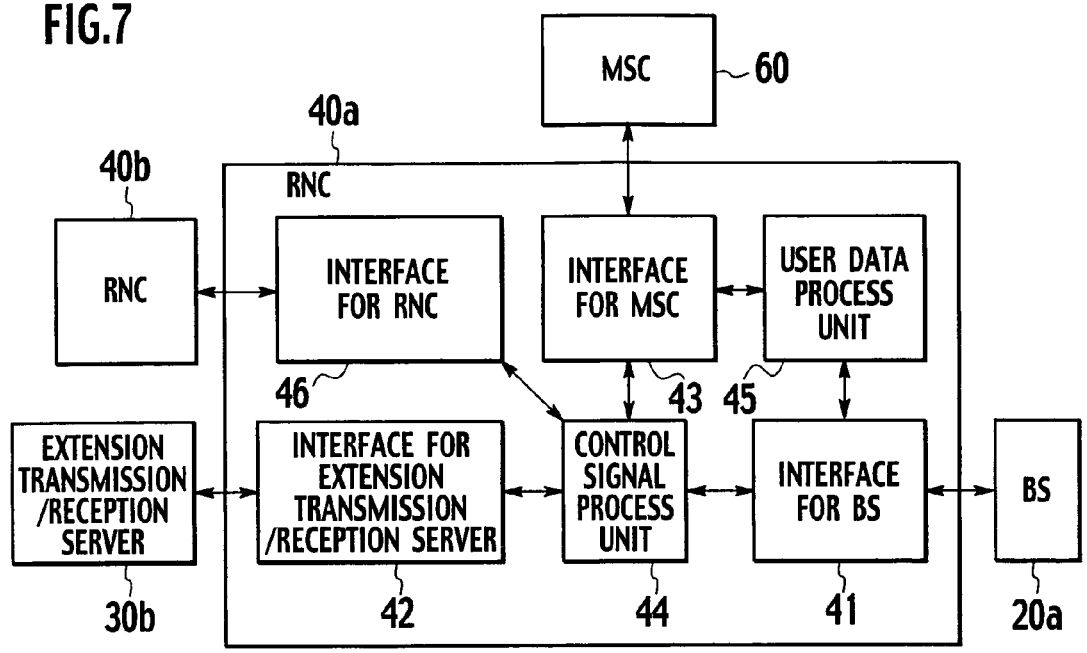
FIG. 7 is a block diagram showing configuration of a radio network controller in accordance with the embodiment of the present invention.

As shown in FIG. 7, the RNC 40*a* has its interface for BS 41, interface for extension transmission/reception server 42, interface for MSC 43, control signal process unit 44, and interface for RNC 46. The interface for BS 41 transmits/receives the user data and the control data to/from the BS 20*b*. The interface for extension transmission/reception server 42 transmits/receives extension transmission/reception control data to/from the extension transmission/reception server 30*b*. The interface for MSC 43 transmits/receives user data and control data to/from the MSC 60.

The control signal process unit 44 processes control data, which is transmitted/received among the interface for BS 41, the interface for extension transmission/reception server 42, and the interface for MSC 43. Specifically, the control signal process unit 44 obtains control data, which is received by the interface for BS 41, from the interface for BS 41, and inputs the data to the interface for MSC 43. The control signal process 44 obtains extension transmission/reception control data, which is received by the interface for extension transmission/reception control server 42, from the interface for extension transmission/reception control server 42, and inputs the data to the interface for MSC 43.

The control signal process unit 44 obtains mobile station control data and extension transmission/reception control data for the BS 20*b*, which are received by the interface for MSC 43, from the interface for MSC 43, and inputs the data to the interface for BS 41. The control signal process unit 44 obtains extension transmission/reception control data for the extension transmission/reception server 30*b*, which is received by the interface for MSC 43, from the interface for MSC 43, and inputs the data to the interface for extension transmission/reception server 42. The control signal process unit 44 may transmit the extension transmission/reception control data directly to the extension transmission/reception server 30*b*, or may transmit to the extension transmission/reception server 30*b* via the RNC 40*b*, which controls the extension transmission/reception server 30*b*. Further, as shown in FIG. 4, the RNC 40*a* has a table which relates a name of the extension transmission/reception server to IP address, which is notified from the MSC 60, so that the RNC 40*a* can transmit/receive control data and user data to/from the extension transmission/reception server.

Also, the control signal process unit 44 functions as a communication control unit, which controls radio communication carried out between the MS 10*b* and the BS 20*b*. The control signal process unit 44 controls the BS 20*b* for radio communication control. Specifically, the control signal process unit 44 assigns a radio channel for transmitting/receiving the data between the MS 10*b* and the BS 20*b*. The control signal process unit 44 manages the assignment and the usage status of those radio resources. Also, the control signal process unit 44 controls the hand-over and the like. The control signal process unit 44 transmits/receives information relating to the control of the radio communication such as information with respect to the assignment of the radio channel, as the control data to/from the BS 20*b* via the interface for BS 41. Also, when a plurality of BSs connect to the RNC 40*a*, the control signal process unit 44 controls the radio communication carried out by the plurality of BSs.

The user data process unit 45 processes user data to be transmitted/received between the interface for BS 41 and the interface for MSC 43. Specifically, the user data process unit 45 obtains user data, which is received by the interface for BS 41, from the interface for BS 41, and inputs the data to the interface for MSC 43. Also, the user data process unit 45 obtains user data, which is received by the interface for MSC 43, from the interface for MSC 43, and inputs the data to the interface for BS 41.

When transmitting extension transmission/reception control data to the extension transmission/reception server 30*b* located in different radio access network, the interface for RNC 46 transmits extension transmission/reception control data to the RNC 40*b* controlling the extension transmission/reception server 30*b*. Then, the RNC 40*b* transmits extension transmission/reception control data to the extension transmission/reception server 30*b*.

The RNC 40*b* also has the same configuration as that of the RNC 40*a*. In the case of the RNC 40*b*, the interface for BS 41 transmits/receives user data and control data to/from the BS 20*b*. Also, the control signal process unit 44 controls the BS 20*b* to control the radio communication between the MS 10*b* and the BS 20*b*.

The MSC 60 is a mobile switching center for transmission/reception of user data and control data, which are transmitted/received between the MSs 10*a* and 10*b*, in the core network 80. Also, the MSC 60 functions as a controller, which determines whether or not the user data to be transmitted/received between the MSs 10*a* and 10*b* is transmitted/received by extension transmission/reception, which transmits/receives the data within the radio access network 50 or between different radio access networks 50. The HLR 70 is a subscriber information database, which stores ubscriber information. As shown in FIG. 4, the MSC 60 connects to the RNCs 40*a*, 40*b* and the HLR 70. The MSC 60 transmits/receives user data and control data to/from the RNCs 40*a* and 40*b*. The MSC 60 refers to the subscriber information stored in the HLR 70. The MSC 60 may connect to another MSC or a network other than the radio access network 50 and the core network 80. The HLR 70 connects to the MSC 60.

Figure 8:
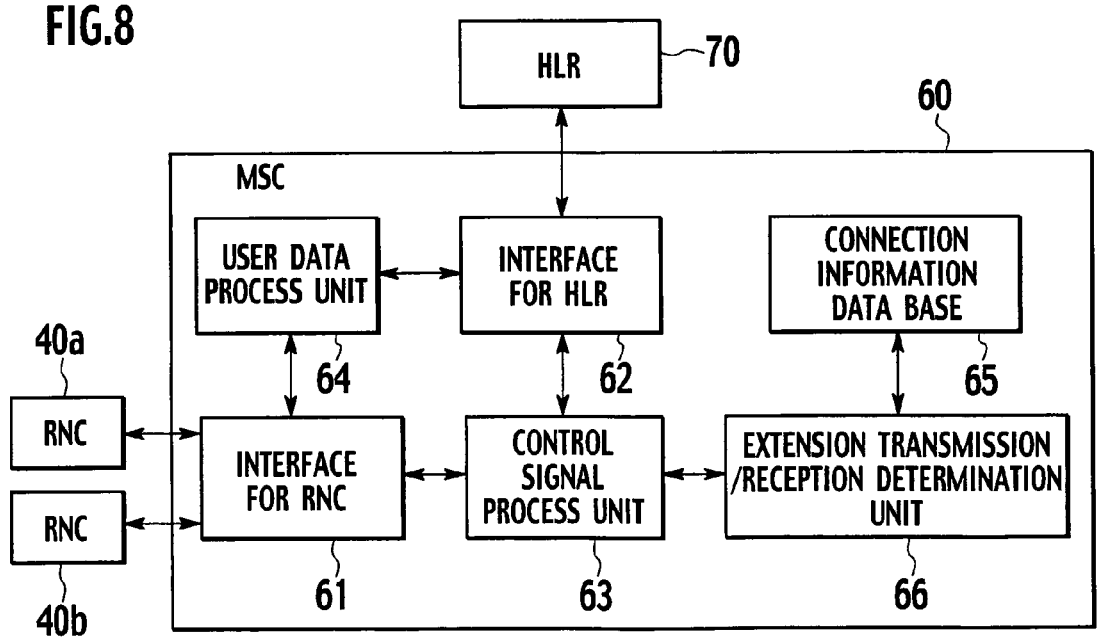
FIG. 8 is a block diagram showing configuration of a mobile switching center in accordance with the embodiment of the present invention.

As shown in FIG. 8, the MSC 60 includes an interface for RNC 61, an interface for HLR 62, a control signal process unit 63, a user data process unit 64, a connection information database for transmission/reception server (hereinafter, referred to as "connection information DB") 65, and an extension transmission/reception determination unit 66.

Figures 9A, 9B, 10:
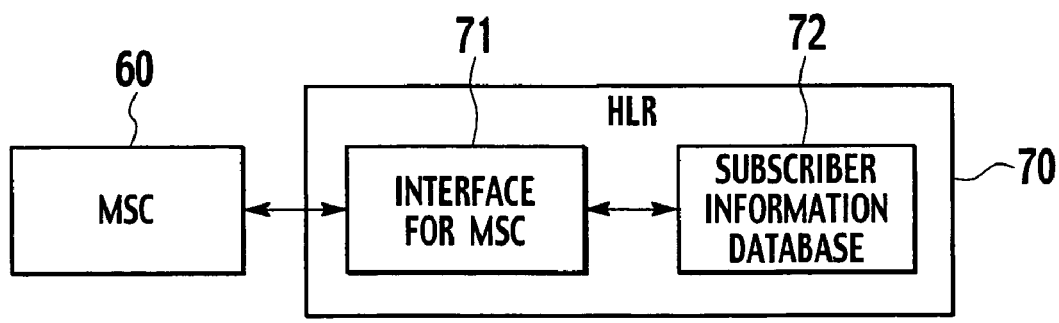
FIGS. 9A and 9B are diagrams showing a connection information databases in accordance with the embodiment of the present invention.
FIG. 10 is a block diagram showing configuration of an HLR in accordance with embodiment of the present invention.

The connection information DB 65 stores extension transmission/reception server connection information relating to extension transmission/reception servers, which are adapted for transmission/reception the user data to/from the BS. The extension transmission/reception server connection information stores the relationship with the BS and the RNC, which accommodates the BS, as shown in FIG. 9A, and the relationship with the RNC and the extension transmission/reception server, which is under control of the RNC, as shown in FIG. 9B. The connection information DB 65 has a field for storing the BS name, a field for storing the RNC name controlling the BS, a field for storing the name of extension transmission/reception server controlled by the RNC, and a field for storing the IP address of the extension transmission/reception server. The connection information DB 65 stores the BS name, the RNC name controlling the BS, the name of extension transmission/reception server controlled by the RNC, and the IP address of the extension transmission/reception server while associating the same with each other. The BS name, the RNC name and the name of the extension transmission/reception server are the names for identifying the BS, the RNC, and the extension transmission/reception server.

In FIGS. 9A and 9B, numerals "01"-"03" are used for BS names, RNC names and names of extension transmission/reception server. If the identification information uniquely identifies the extension transmission/reception server, the BS name, the RNC name, and the name of extension transmission/reception server are not specifically limited. When there is no extension transmission/reception server, which is controlled by the RNC, "Null" is recorded in the field of the name of the extension transmission/reception server. The name of the extension transmission/reception server 30*a* is "extension transmission/reception server 01" and the name of the extension transmission/reception server 30*b* is "extension transmission/reception server 02". Therefore, according to the connection information, it can be recognized that the extension transmission/reception servers, which connects to the BSs 20*a* and 20*b*, are the extension transmission/reception servers 30*a* and 30*b*. When the extension transmission/reception server 30*b* is selected, by the MSC 60, as a server for carrying out the extension transmission/reception, the IP address can be recognized as "255.255.255.2".

As described above, according to the connection information, not only the extension transmission/reception server, which connects to the BS, can be uniquely identified, but also IP address of the extension transmission/reception server can be recognized. Here, the "extension transmission/reception server, which connects to the BS" indicates an extension transmission/reception server, which is capable of transmitting/receiving the user data to/from the BS. Accordingly, not only in the case where no extension transmission/reception server connecting to the BS is provided, but also in the case where an extension transmission/reception server connecting to the BS is not available due to some trouble, it is determined as no extension transmission/reception server connecting to the BS is provided. In accordance with the connection information, it is possible to determine whether or not an extension transmission/reception server, which is capable of transmitting/receiving use data to/from the BS. There may be a case where the radio access network has no extension transmission/reception server.

The extension transmission/reception determination unit 66 determines whether or not user data is transmitted/received by using the extension transmission/reception. When it is determined that user data is transmitted/received by extension transmission/reception, the extension transmission/reception determination unit 66 selects an extension transmission/reception server to be used for the extension transmission/reception. That is, the extension transmission/reception determination unit 66 selects an extension transmission/reception server, to which the BS transmits/receives the user data.

Based on the determination information, the extension transmission/reception determination unit 66 determines whether or not user data is transmitted/received by extension transmission/reception, and selects an extension transmission/reception server used for the extension transmission/reception. The extension transmission/reception determination unit 66 refers the existence or absence of the extension transmission/reception server, which is capable of transmitting/receiving user data to/from the BS, as determination information. Specifically, the extension transmission/reception determination unit 66 obtains identification information of the BS, to which the communication source MS requesting to transmit user data is connected, and identification information of the BS to which the communication destination MS is connected. The extension transmission/reception determination unit 66 refers the connection information DB 65. And, based on the obtained identification information of the BS, the extension transmission/reception determination unit 66 retrieves the connection information DB 65 and determines whether or not there are any extension transmission/reception server connecting to the BS.

When it is determined that there exist the extension transmission/reception server connecting to the BS to which the communication source MS is connected, or the extension transmission/reception server connecting to the BS to which the communication destination MS is connected, the extension transmission/reception determination unit 66 selects one of the extension transmission/reception servers. When there exist a plurality of extension transmission/reception servers connecting to the BS, oen of those extension transmission/reception servers is selected based on the traffic load and the process capacity. According to the embodiment of the present invention, it is explained the case in which the extension transmission/reception server, which is connecting to the BS communicating with the communication destination MS, is selected. However, the extension transmission/reception server, which is connecting to the BS communicating with the communication source MS, can be selected.

Then, the extension transmission/reception determination unit 66 obtains an IP address of the selected extension transmission/reception server. The extension transmission/reception determination unit 66 inputs the determination result to the control signal process unit 63. The determination results includes not only whether or not the user data transmission/reception are carried out by extension transmission/reception, but also a determination that user data transmission/reception are carried out via the MSC 60, and the IP address of the selected extension transmission/reception server, and so on.

The interface for RNC 61 transmits/receives the user data and control data to/from the RNCs 40*a* and 40*b*. The interface for RNC 61 transmits the determination results made by the extension transmission/reception determination unit 66 as extension transmission/reception control data, and functions as a determination result transmission unit, which transmits the determination result. The interface for RNC 61 transmits the determination result to the BS to which the communication source MS requesting for the transmission of user data, the BS to which the communication destination MS is connected, and the extension transmission/reception server via the RNCs 40*a* and 40*b*.

The control signal process unit 63 processes control data transmitted/received by the interface for RNC 61. Specifically, the control signal process unit 63 obtains identification information that identifies the communication destination of mobile station control data, which are received by the interface for RNC 61. The control signal process unit 63 notifies identification information of the communication destination to the interface for HLR 62 and instructs to provide subscriber information of the communication destination MS. And the control signal process unit 63 obtains identification information of the BS to which the communication destination MS is connected, as subscriber information from the interface for HLR 62. Based on the obtained identification information of the BS, the control signal process unit 63 gives an instruction to the interface for RNC 61 to transmit the received mobile station control data to the RNC connecting to the BS corresponding to the obtained identification information. The control signal process unit 63 maintains the connection relationship between the BS and the RNC in advance.

Further, when mobile station control data is a call request that the MS requests for the transmission of user data, the control signal process unit 63 obtains identification information that identifies the communication source and the communication destination of the call request. The control signal process unit 63 notifies the interface for HLR 62 of identification information of the communication source and the communication destination, and instructs to provide subscriber information of the communication source MS and the communication destination MS. And the control signal process unit 63 obtains identification information of the BSs connecting to the communication source MS and the communication destination MS, as subscriber information from the interface for HLR 62.

The control signal process unit 63 inputs the identification information of the BSs, which are connecting to the communication source MS and the communication destination MS, to the extension transmission/reception determination unit 66. And the control signal process unit 63 obtains the determination result from the extension transmission/reception determination unit 66. The control signal process unit 63 inputs the obtained determination result to the interface for RNC 61, and instructs to transmit the determination result to the BS connecting to the communication source MS of the call request, the BS connecting to the communication destination MS and the extension transmission/reception server via the RNCs 40*a* and 40*b*.

The user data process unit 64 processes the user data transmitted/received by the interface for RNC 61. Specifically, the user data process unit 64 obtains identification information that identifies the communication destination of the user data, which is received by the interface for RNC 61. The user data process unit 64 notifies the identification information of the communication destination to the interface for HLR 62, and instructs to provide subscriber information of the communication destination MS. And the user data process unit 64 obtains identification information of the BS connecting to the communication destination MS, as subscriber information from the interface for HLR 62. Based on the obtained identification information of the BS, the user data process unit 64 gives an instruction to the interface for RNC 61 to transmit the received user data to the RNC connecting to the BS corresponding to the obtained identification information.

The interface for HLR 62 refers to the HLR 70 in accordance with the control of the control signal process unit 63 and the user data process unit 64. Specifically, the interface for HLR 62 receives the notification of identification information of the MS from the control signal process unit 63 and the user data process unit 64. The interface for HLR 62 transmits a request for subscriber information to the HLR 70. The request for subscriber information includes identification information of the notified MS. And the interface for HLR 62 receives subscriber information, upon the request, from the HLR 70. The interface for HLR 62 receives, for example, identification information and the like of the BS connecting to the MS, as subscriber information. The interface for HLR 62 inputs the obtained subscriber information to the control signal process unit 63 and the user data process unit 64.

As shown in FIG. 10, the HLR 70 includes an interface for MSC 71 and subscriber information database (hereinafter, as "subscriber information DB") 72. The subscriber information DB 72 stores subscriber information. The subscriber information DB 72 stores, as subscriber information, information for the communication such as location information, which is the relationship between the MS and the BS connecting to the MS, and authentication information of the MS. The MS and the BS connecting to the MS may be associated with each other by using, for example, identification information of the MS and the BS.

The interface for MSC 71 provides subscriber information to the MSC 60 in accordance with the request from the MSC 60. Specifically, the interface for MSC 71 receives a request, from the MSC 60, for subscriber information including identification information of the MS. Based on the identification information of the MS, the interface for MSC 71 retrieves the subscriber information DB 72 and obtains corresponding subscriber information. The interface for MSC 71 obtains, for example, identification information of the BS connecting to the MS as the subscriber information. The interface for MSC 71 transmits the obtained subscriber information to the MSC 60.

The mobile communication system 100 is capable of performing connectionless communication. Accordingly, every device; i.e., the MSs 10*a*, 10*b*, the BSs 20*a*, 20*b*, the extension transmission/reception server 30*a*, 30*b*, the RNCs 40*a*, 40*b*, the MSC 60, and the HLR 70 are capable of transmitting/receiving data by connectionless communication. As a result, the mobile communication system 100 can be provided and extended easily. When a trouble occurs on the communication path or device itself, the mobile communication system 100 can make a detour the troubled portion easily resulting in an increased reliability. Further, every device, i.e., the MSs 10*a*, 10*b*, the BSs 20*a*, 20*b*, the extension transmission/reception servers 30*a*, 30*b*, the RNCs 40*a*, 40*b*, the MSC 60, and the HLR 70 is capable of transmitting/receiving control data as control signals.

(Communication Method)

Figure 11:
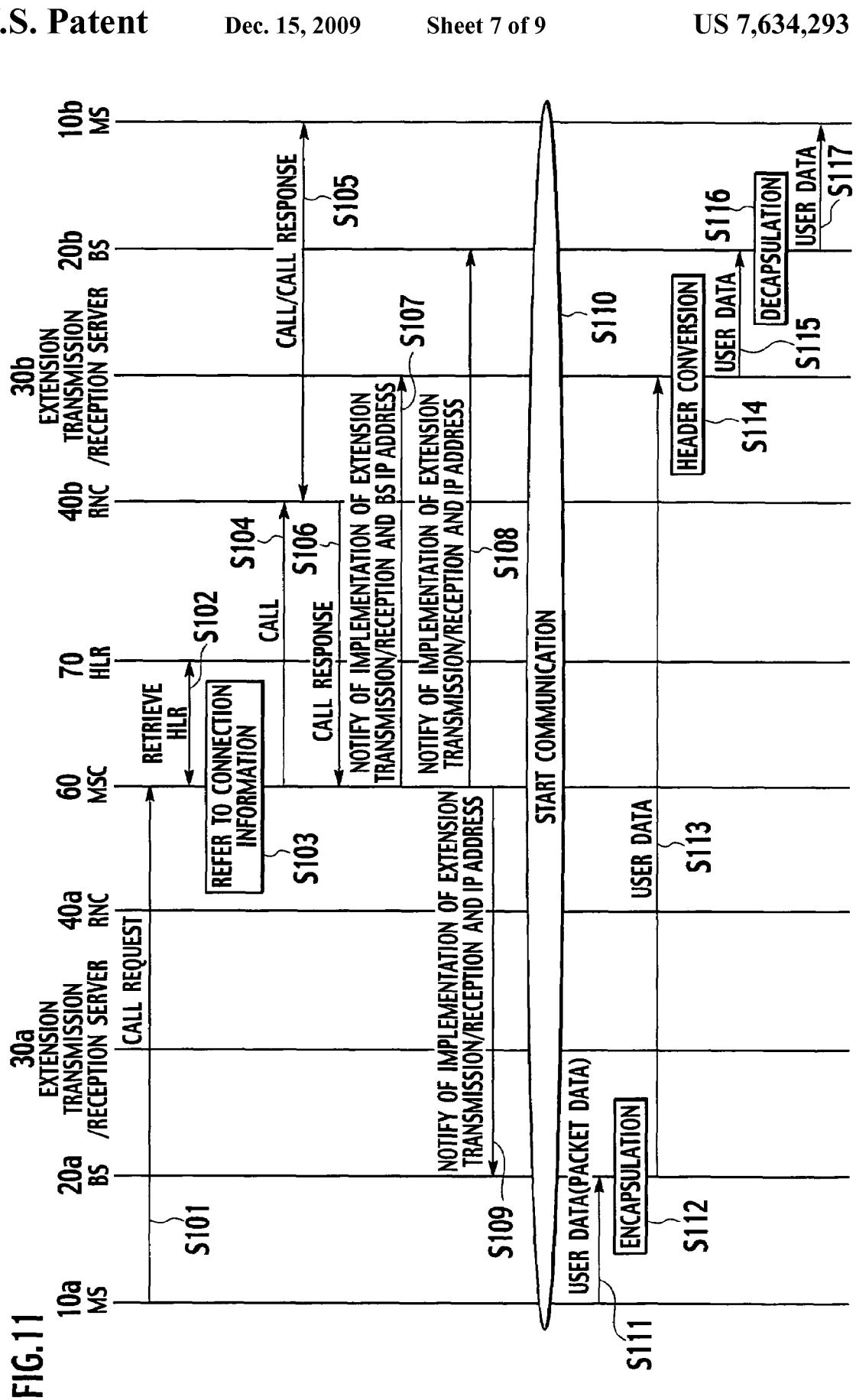
FIG. 11 is a flow chart showing a procedure of the communication method in accordance with the embodiment of the present invention (No.1).

Referring to FIG. 11, the communication method with the mobile communication system 100 will be described. FIG. 11 shows the case where the MS 10*a*, which is in the radio zone of the BS 20*a*, is a communication source and the MS 10*b*, which is in the radio zone of the BS 20*b*, is a communication destination. Here, it is explained the case where the extension transmission/reception is performed in use of only the extension transmission/reception server 30*b* under control of the RNC 20*b*, which accommodates the BS 20*b*. Further, in FIG. 11, the user data to be transmitted is packet data, which is used for I-mode (registered trademark) and the like.

First, the MS 10*a* transmits a call request, which requests for the transmission of the user data, to the MSC 60 via the BS 20*a* and the RNC 40*a* (S101). The MSC 60 refers to the HLR 70 and obtains identification information of the BSs 20*a* and 20*b* to which the communication source MS 10*a* and the communication destination MS 10*b* connect respectively, as subscriber information (S102). According to this, the MSC 60 detects that each of the MSs 10*a* and 10*b* connects to the BSs 20*a* and 20*b* respectively.

Based on the identification information of the BSs 20*a* and 20*b*, the MSC 60 refers to the extension transmission/reception server connection information of the BSs 20*a* and 20*b* (S103). According to this, the MSC 60 detects that the BS 20*a* connecting to the MS 10*a* connects to the extension transmission/reception server 30*a*; and the BS 20*b* connecting to the MS 10*b* connects to the extension transmission/reception server 30*b*. When the MSC 60 determines to carry out the transmission/reception of the user data by using the extension transmission/reception, the MSC 60 selects an extension transmission/reception server from a plurality of extension transmission/reception servers, according to the raffic load and the process capacity. Here, the extension transmission/reception server 30*b* is selected as an extension transmission/reception server to be used for the extension transmission/reception.

Then, the MSC 60 gives an instruction to the RNC 40*b* to call the MS 10*b* (S104). Receiving the instruction, the RNC 40*b* calls the MS 10*b*, and the MS 10*b* responses to the call via the BS 20*b* (S105). The RNC 40*b* notifies the MSC 60 of reception of call response (S106).

Further, the MSC 60 notifies the extension transmission/reception server 30*b* of the implementation of the transmission/reception of the user data transmitted/received between the MSs 10*a* and 10*b* by using extension transmission/reception. Further, the MSC 60 notifies the extension transmission/reception server 30*b* of the IP address of the BS 20*b*, which is the communication destination of the user data transmission (S107).

The MSC 60 notifies the BS 20*b* connecting to the MS 10*b* (communication destination MS) and the BS 20*a* connecting to the MS 10*a* (communication source MS) of the implementation of transmission/reception by extension transmission/reception. Further, the MSC 60 notifies the BSs 20*b* and 20*a* of the IP address of the extension transmission/reception server 30*b*, which is used for the extension transmission/reception (S108 and S109).

According to the above-described process, the communication starts between the MS 10*a* and the MS 10*b* (S110).

After the communication starts, the MS 10*a* (communication source MS) transmits user data to the BS 20*a* (S111). The BS 20*a* encapsulates the user data received from the MS 10*a* by using the IP address of the extension transmission/reception server 30*b* (S112). The BS 20*a* transmits the encapsulated user data to the extension transmission/reception server 30*b* (S113).

The extension transmission/reception server 30b obtains the destination identification information included in the header (Here, it is the header of the encapsulated user data and it is referred as "encapsulated header" herein after) of the packet received from the BS 20a. The extension transmission/reception server 30b refers to the table shown in FIG. 4. When the destination UDP port number included in the received encapsulated header is "1", the extension transmission/reception server 30b converts the header of the received packet in use of the IP address 255.255.255.11 (the IP address of the BS 20b in FIG. 4) included in the transmitting packet and the destination UDP port number "1" included in the transmitting packet, by referring to the table (S114). In this case, the extension transmission/reception server 30b converts the data format of the data relating to the user data security and the like to the format according to the configuration information for the call of the MS 10b. Then, the extension transmission/reception server 30b transmits the user data to the BS 20b by using the extension transmission/reception (S115).

The BS 20b decapsulates the user data received from the extension transmission/reception server 30b (S116). The BS 20b transmits the user data to the MS 10b (S117).

Accordingly, in the mobile communication system 100, when user data is transmitted/received by extension transmission/reception, the path A of user data is resulted in as shown in FIG. 4. The user data is, without using the MSC 60 and the extension transmission/reception server transmitted/received 30a, transmitted/received through the path A, which goes through the MS 10a, the BS 20a, the extension transmission/reception server 30b, the BS 20b, and the MS 10b.

That is, in the case when the communication source MS 10a and the communication destination MS 10b are respectively connecting to the BSs 20a and 20b which are capable to transmit/receive the user data to/from the extension transmission/reception server 30a and 30b; the communication source BS 20a connecting to the communication source MS 10a receives the user data transmitted from the communication source MS 10a, and transmits, without using the MSC 60 and the extension transmission/reception server 30a, to the extension transmission/reception server 30b (communication destination) which is capable to transmit/receive the user data to/from the communication source BS 20a. The extension transmission/reception server 30b (communication destination) receives the user data from the communication source BS 20a, and transmits to the communication destination BS 20b connecting to the communication destination MS 10b. The communication destination BS 20b receives the user data from the extension transmission/reception server 30b (communication destination) and transmits to the communication destination MS 10b. Accordingly, the user data transmitted from the communication source MS 10a goes through the path A in the radio access networks 50a and 50b to the communication destination MS 10b.

In the above-described example, the extension transmission/reception server 30b (communication destination) is adapted for the extension transmission/reception. However, it is noted that the extension transmission/reception server 30a (communication source) can be used for the extension transmission/reception. An extension transmission/reception server, which is in a radio access network where neither of the communication source MS 10a or the communication destination MS 10b exists, can be used. The MSC 60 unrestrainedly selects one of the extension transmission/reception servers.

Figure 12:
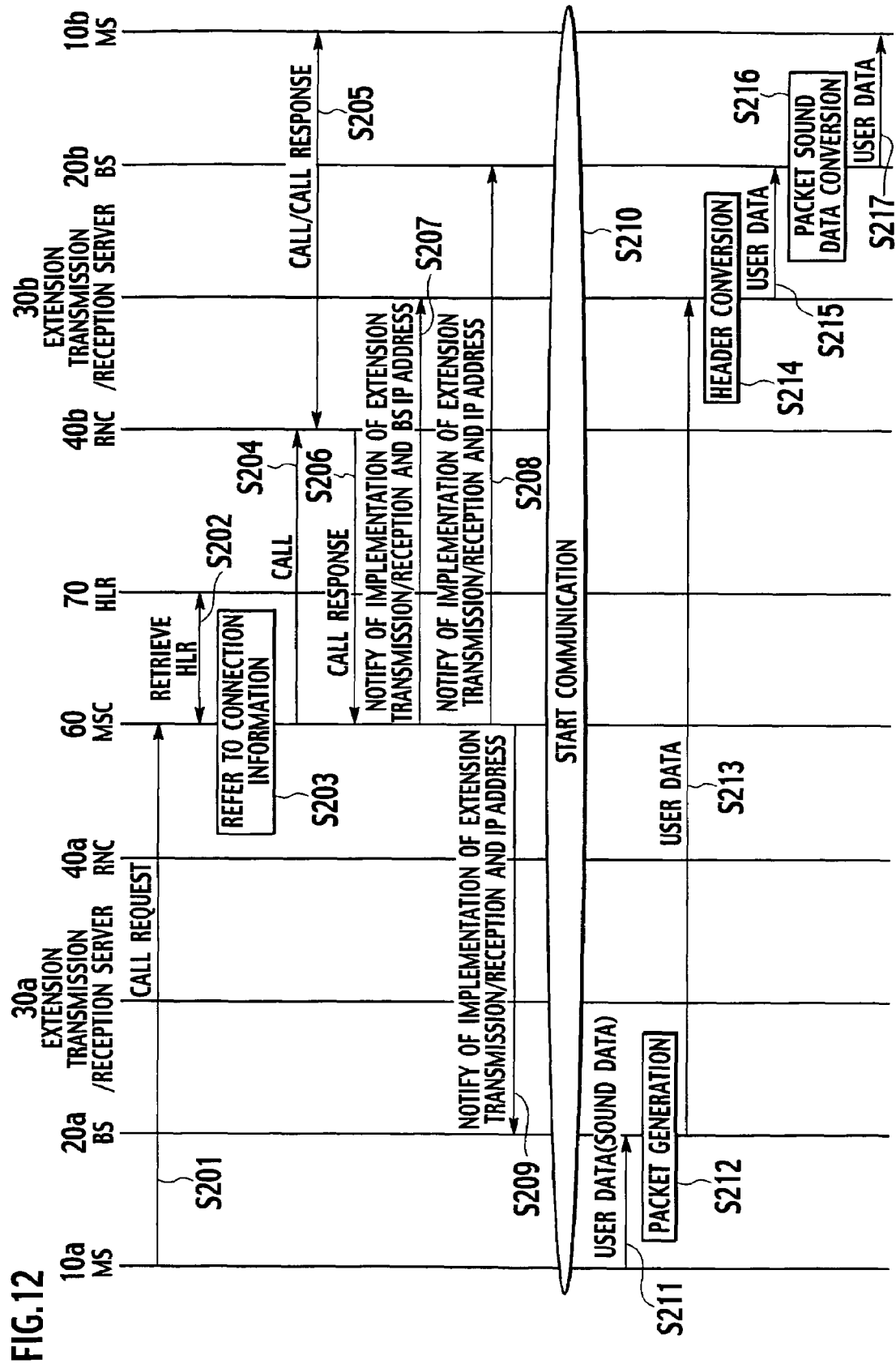
FIG. 12 is a flow chart showing a procedure of the communication method in accordance with the embodiment of the present invention (No.2).
Figure 13:
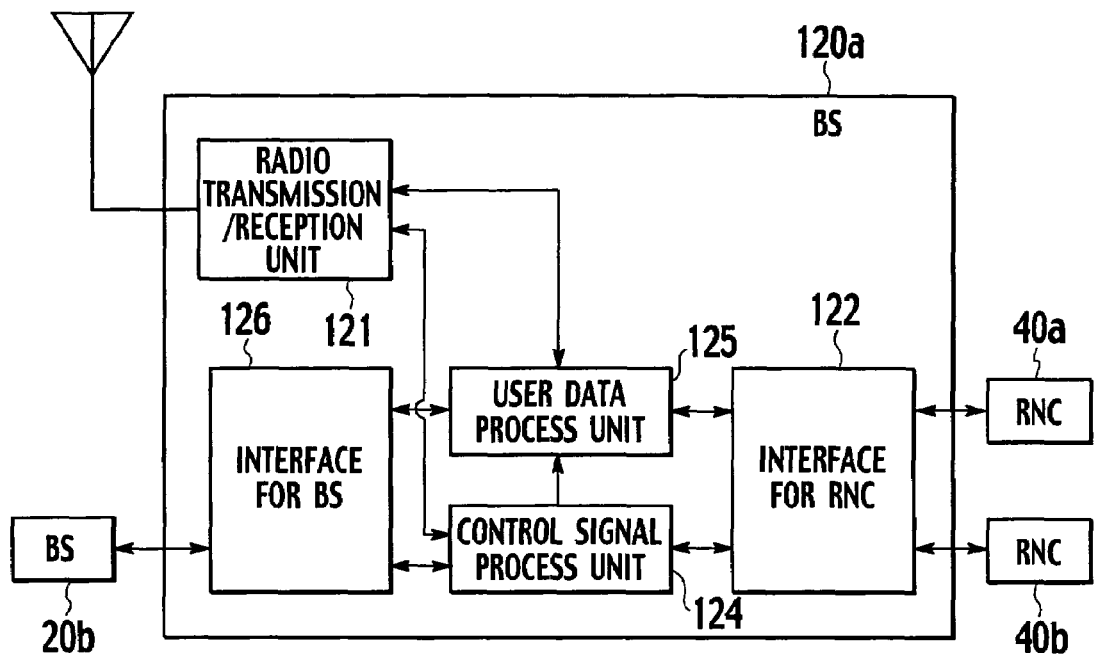
FIG. 13 is a block diagram showing configuration of a base station in accordance with other embodiments of the present invention.

Next, communication method for transmitting sound data as the user data is explained by referring to the FIG. 12. Other than the user data is sound data, the condition is the same as the communication method described in FIG. 11.

The processes in steps S201 to S210 shown in FIG. 12 are the same as the steps S101 to S110 shown in FIG. 11, so that the explanation is omitted here.

After the communication starts, the communication source MS 10a transmits user data to the BS 20a (S211). The BS 20a generates the user data received from the MS 10a as packet data including IP address of the extension transmission/reception server 30b (S212). The BS 20a transmits the packet generated user data to the extension transmission/reception server 30b (S213).

The extension transmission/reception server 30b obtains the destination identification information included in the header (here, header of the user data) of the packet received from the BS 20a. Then, the extension transmission/reception server 30b refers to the table shown in FIG. 4. When the destination UDP port number included in the received header is "1", the extension transmission/reception server 30b converts the header of the received packet in use of the IP address 255.255.255.11 (the IP address of the BS 20b in FIG. 4) included received packet, by referring to the table (S214). In this case, the extension transmission/reception server 30b converts the data format of the data relating to the user data security and the like to the format according to the configuration information for the call of the MS 10b. Then, the extension transmission/reception server 30b transmits the user data to the BS 20b by extension transmission/reception (S215).

The BS 20b converts the user data received from the extension transmission/reception server 30b to sound data (S216). Then, the BS 20b transmits the converted user data to the MS 10b (S217).

In FIG. 11 and FIG. 12, flows of user data are shown. However, mobile station control data, which is transmitted/received between the MSs 10a and 10b, are transmitted/received via the MSC 60 after the communication is started in step S 110. That is, the mobile station control data is transmitted/received via a path going through the MS 10a, the BS 20a, the RNC 40a, the MSC 60, the RNC 40b, the BS 20b, and the MS 10b.

Further, the extension transmission/reception control data may be received via a path going through the RNC 40a, and the extension transmission/reception server 30b (the path B in FIG. 4), or a path going through the RNC 40a, the RNC 40b, and the extension transmission/reception server 30a (the path C in FIG. 4). When using the former paths, the radio controller transmits/receives extension transmission/reception control data directly to the extension transmission/reception device, so that the shortening of the extension transmission/reception control data path and reduction of connection fees can be achieved.

(Effect)

According to the above-described mobile communication system 100, the BSs 20a, 20b, the extension transmission/reception servers 30a, 30b, the RNCs 40a, 40b, the MSC 60, and the communication method, user data can be transmitted/received between the BSs 20a and 20b and a single extension transmission/reception server 30b by extension transmission/reception. Specifically, the interface for BS 31 of the extension transmission/reception server 30b transmits/receives user data between the BSs 20a and 20b by extension transmission/reception, and the interface for extension transmission/reception server 23 of the BSs 20a and 20b may transmit/receive user data to/from the extension transmission/reception server 30b by extension transmission/reception.

As described above, the delay of the user data transmission can be reduced when the user data transmission/reception are always implemented by using a single extension transmission/reception server. Further, the range of user data transmission/reception, which are implemented by the extension transmission/reception, can be easily extended.

To keep the data confidential, the user data may be transmitted in different data formats when transmitted from the communication source MS 10a and when transmitted to the communication destination MS 10b. In such case, the extension transmission/reception server 30a converts the format of the user data transmitted from the communication source MS 10a to the format of the user data for the communication destination MS 10b.

As described above, in the case of transmitting real time data such as sound data, the process to handle delay fluctuation or the process to keep the data confidential can be implemented in a single extension transmission/reception server. Therefore, the processing load of other extension transmission/reception servers can be reduced. Also, the cost for extension server for those functions can be reduced.

It is not necessary to reserve the resource of the extension transmission/reception server 230a in the side of the communication source MS 10a before calling the communication destination MS 10b, so that unnecessary resource reservation in the extension transmission/reception server can be reduced.

The above-described RNC 40a can transmit/receive the extension transmission/reception control data directly to the extension transmission/reception server 30b, which is not exist in the radio access network 50a under control of the RNC 40a. Therefore, shortened path of transmission of the extension transmission/reception control data and reduced communication fee can be achieved. Or, the RNC 40a can transmit/receive the extension transmission/reception control data to/from the extension transmission/reception server 30b, which is not exist in the radio access network 50a under control of the RNC 40a, via the RNC 40b controlling the extension transmission/reception server 30b. Therefore, the RNC 40b can manage the extension transmission/reception server 30b based on the extension transmission/reception control data.

In the mobile communication system 100, the MSs 10a, 10b, the BSs 20a, 20b, the extension transmission/reception servers 30a, 30b, the RNCs 40a, 40b, MSC 60, and the HLR 70 are adapted for data transmission/reception by connectionless communication. Therefore, the mobile communication system 100 can be easily constructed and extended. Further, when a trouble occurs on the communication path or device itself, the mobile communication system 100 can make detour the troubled portion easily resulting in an increased reliability.

The extension transmission/reception servers 30a and 30b can transmit/receive the extension transmission/reception control data to/from the RNCs 40a and 40b via the interface for RNC 32. Therefore, RNCs 40a and 40b can manage the BSs 20a and 20b based on the extension transmission/reception control data.

The MSC 60 has an extension transmission/reception determination unit 66, which selects one of the extension transmission/reception servers 30a and 30b for the implementation of the extension transmission/reception based on the traffic load and the process capacity of the extension transmission/reception devices. Therefore, the most preferable extension transmission/reception device can be selected.

The BSs 20a and 20b manage the sessions according to the combination of the IP address of the extension transmission/reception server and the UDP port number. Accordingly, number of sessions can be easily increased.

OTHER EMBODIMENTS

The present invention has been described according to the embodiment described above. However, it should be understood that the present invention is not limited by the description and drawings, which constitute a part of this disclosure. Various alternative embodiments, embodiments and operational technologies will become apparent to those skilled in the art from this disclosure.

For example, in the mobile communication system 100, shown in FIG. 4, the MSC 60 functions as a controller to determine whether or not to transmit/receive user data by extension transmission/reception and select an extension transmission/reception server. However, the controller should not be limited to the MSC 60. The BSs 20a, 20b, the RNCs 40a, 40b, or the extension transmission/reception servers 30a, 30b may function as a controller to determine whether or not to transmit/receive user data by extension transmission/reception. Or, a controller to determine whether or not to transmit/receive user data by extension transmission/reception can be provided somewhere in the radio access networks 50a and 50b, or core network 80.

In those cases, the BSs 20a, 20b, the RNCs 40a, 40b, the extension transmission/reception servers 30a, 30b, and the newly provided controller may include, as shown in FIG. 8, an extension transmission/reception determination unit 66, an connection information DB 65, a determination information reception unit served by the interface for RNC 61, a determination result transmission unit and obtaining unit, which obtains the relationship between the MS and the BS connecting to the MS from the MSC 60 or the HLR 70.

In the mobile communication system 100, shown in FIG. 4, the MSC 60 is used, however, a distribution MSC and an integration MSC may be used as the MSC. In this case, also, according to the user data transmitted/received by extension transmission/reception, the path of the user data for the communications between the MSs, which are controlled by the different distribution MSCs, can be shortened.

The extension transmission/reception determination unit 66 determines whether or not the user data transmission/reception are carried out by extension transmission/reception, based on the traffic load. Accordingly, for example, the quality of the service provided by a communication service provider can be preset minutely. In this case, the qualities of service for the respective users are registered as the subscriber information in the HLR 70. In addition to the traffic load, by using the subscriber information, the extension transmission/reception determination unit 66 determines whether or not the user data transmission/reception are carried out by extension transmission/reception, and selects an extension transmission/reception server. According to this, the extension transmission/reception determination unit 66 can identify the service subscribed by the user, and thus provide appropriate service to the respective users.

The extension transmission/reception determination unit 66 can use the process capacity of the extension transmission/reception server for the determination information, whether or not the user data transmission/reception are carried out by extension transmission/reception, then select an extension transmission/reception server. As a result, the extension transmission/reception determination unit 66 can control whether or not the user data transmission/reception are carried out by extension transmission/reception or via the MSC 60, and which extension transmission/reception server to be selected for the implementatuion of the extension transmission/reception, based on the process capacity of the extension transmission/reception servers. Accordingly, the mobile communication system can maintain the quality of the transmission/reception of user data by extension transmission/reception and distribute the load. Further, the extension transmission/reception determination unit 66 can determine based on the following conditions by combining two or more thereof, i.e., the traffic load in the radio access network, the process capacity of the extension transmission/reception server, the request extension transmission/reception from the MS and the existence or absence of the extension transmission/reception server, which is capable to transmit/receive the user data to/from the BS.

In FIG. 4, the extension transmission/reception servers 30a and 30b are provided, which mainly function to transmit/receive user data to/from the BS and another extension transmission/reception server by extension transmission/reception. However, the BS and the radio network controller can function as an extension transmission/reception server.

For example, the BS 120a, shown in FIG. 11, transmits/receives user data to/from another BS 20b by extension transmission/reception, which transmits/receives the data between radio access networks. The BS 120a has an interface for BS 126, an interface for RNC 122, a control signal process unit 124, a user data process unit 125, and a radio transmission/reception unit 121.

The interface for BS 126 is substantially the same as the interface for BS 31 shown in FIG. 6. The interface for BS 126 serves as a base station transmission/reception unit for user data transmission/reception with another BS 20b by extension transmission/reception, which transmits/receives data between radio access networks. The interface for RNC 122 functions as the interface for RNC 22 shown in FIG. 5, and the interface for RNC 32 shown in FIG. 6. The control signal process unit 124 functions as the control signal process unit 24 shown in FIG. 5 and the control signal process unit 33 shown in FIG. 6. The user data process unit 125 functions as the user data process unit 25 shown in FIG. 5 and the user data process unit 34 shown in FIG. 6. The user data process unit 125 provides an address of the BS 20b, which is controlled by the RNC 40b, to user data received from the MS 10a. The radio transmission/reception unit 121 is substantially the same as the radio transmission/reception unit 21 shown in FIG. 5.

The BS 120a, as described above, may be used in place of the BS 20a and the extension transmission/reception servers 30a and 30b shown in FIG. 4. The BS 120a serves both of the function of the extension transmission/reception, which transmits/receives user data to/from the BS 20b by extension transmission/reception, and the function of the BS, which performs radio communications with the MS 10a. Specifically, the interface for BS 126 transmits/receives user data to/from another BS 20b by extension transmission/reception. Accordingly, when the MSC 60 selects the BS 120a as an extension transmission/reception server for the implementation of the extension transmission/reception, the BS 120a can transmit/receive user data to/from the BS 20b without using the MSC 60 or other extension transmission/reception servers, which exist outside of the radio access networks 50a and 50b. The BS 120a includes the functions of the extension transmission/reception servers 30a and 30b. Therefore, without providing the extension transmission/reception servers 30a and 30b, the delay of the user data transmission is shortened, the processing load of the other extension transmission/reception devices are reduced, and, as a result of those, the cost can be reduced.

Figure 14:
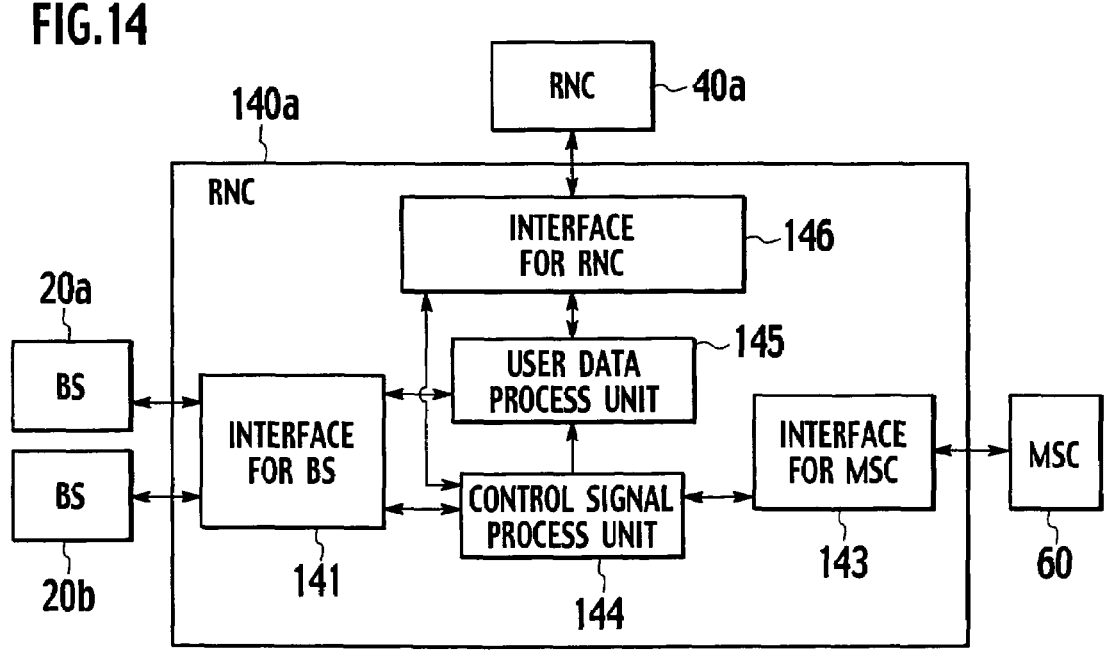
FIG. 14 is a block diagram showing configuration of an extension transmission/reception server in accordance with other embodiments of the present invention.

The RNC 140a, shown in FIG. 14, transmits/receives user data to/from the BSs 20a, 20b and the RNC 40a by extension transmission/reception, which transmits/receives the data between radio access networks. The RNC 140a has its inter face for BS 141, interface for MSC 143, control signal process unit 144, user data process unit 145, and interface for RNC 146.

The interface for BS 141 functions as the interface for BS 41 shown in FIG. 7, and as a base station transmission/reception unit, which transmits/receives user data to/from the BSs 20a and 20b by extension transmission/reception which transmits the data between radio access networks. The inter face for MSC 143 is substantially the same as the interface for MSC 43 shown in FIG. 7. The control signal process unit 144 functions as the control signal process unit 44 shown in FIG. 7. The user data process unit 145 functions as the user data process unit 45 shown in FIG. 7. The user data process unit 145 provides an address of the BS 20b, which is controlled by the RNC 40a, to user data received from the MS 10a via the BS 20a controlled by the RNC 140a. The interface for RNC 146 is substantially the same as the interface for RNC 32 shown in FIG. 6, and functions as an extension transmission/reception unit, which transmits/receives user data to/from another RNC 40a by extension transmission/reception.

The RNC 140a, as described above, may be used in place of the RNC 40a and the extension transmission/reception servers 30a and 30b shown in FIG. 4. Accordingly, the RNC 140a serves both of the function of extension transmission/reception, which transmits/receives user data to/from the BSs 20a and 20b by extension transmission/reception, and the function of the RNC, which controls radio communications between the MS 10a and BS 20a. Specifically, the interface for BS 141 transmits/receives user data to/from the BSs 20a and 20b by extension transmission/reception. Further, the interface for RNC 146 transmits/receives control data and user data to/from another RNC 40b by extension transmission/reception.

When the MSC 60 selects the RNC 140a as an extension transmission/reception server for the implementation of the extension transmission/reception, the RNC 140a transmits/receives user data to/from the BSs 20a and 20b without using the MSC 60, which is in outside of the radio access networks 50a and 50b. The RNC 140b functions as extension transmission/reception servers 30a and 30b. Therefore, without providing the extension transmission/reception server 30a and 30b, the delay of user data transmission can be shortened, the processing load of other extension transmission/reception servers can be reduced, and, as a result of those, the cost can be reduced.

As described above, various modifications will become possible for those skilled in the art after receiving the teaching of the present disclosure without departing from the scope thereof.

What is claimed is:

1. A mobile communication system including a first radio access network, a second radio access network different from the first radio access network, and a core network, wherein
the first radio access network comprises a first base station configured to communicate with a first mobile station and a first extension transmission/reception server configured to connect to the first base station;
the second radio access network comprises a second base station configured to communicate with a second mobile station;
the core network comprises a mobile switching center;
the first base station receives mobile station control data from the first mobile station and transmits the mobile station control data to the second mobile station via the mobile switching center and the second base station;

the mobile switching center notifies the first base station of a first address, which indicates an address of the first extension transmission/reception server and notifies the first extension transmission/reception server of a second address, which indicates an address of the second base station;

the first base station receives user data from the first mobile station and transmits the user data to the first extension transmission/reception server, without going through the mobile switching center, based on the first address provided by the mobile switching center;

the first extension transmission/reception server receives the user data from the first base station, without going through the mobile switching center, and transmits the user data to the second base station, without going through the mobile switching center, based on the second address provided by the mobile switching center; and the second base station receives the user data from the first extension transmission/reception server, without going through the mobile switching center, and transmits the user data to the second mobile station.

2. The mobile communication system of claim 1, wherein the second radio access network further comprises a second extension transmission/reception server configured connect to the second base station;

the mobile switching center selects either the first extension transmission/reception server or the second extension transmission/reception server;

the selected transmission/reception server receives the user data from the first mobile station via the first base station and transmits the user data to the second base station based on the second address provided by the mobile switching center; and the second base station receives the user data from the selected extension transmission/reception server and transmits the user data to the second mobile station.

3. The mobile communication system of claim 2, wherein the extension transmission/reception server and the second extension transmission/reception server comprise a data converter configured to convert a format of the user data, which is transmitted by the first mobile station, to a format of the user data to be received by a second mobile station when the format of the user data transmitted by the first mobile station is different from the format of the user data to be received by the second mobile station.

4. The mobile communication system of claims 1 or 2, wherein data transmission and data reception among the first mobile station, the first base station, the second base station, the extension transmission/reception server and the mobile switching center are implemented by connectionless communication.

5. A mobile switching center included in a core network, the mobile switching center comprising:

an interface for a radio network controller configured to transmit/receive control data, which is transmitted from a mobile station, to/from a radio network controller;

a database configured to store connection information, which associates a base station connected to the radio network controller with an extension transmission/reception server capable of communicating with the base station, the extension transmission/reception server included in a radio access network different from the core network and the base station transmitting mobile station control data to another base station via the mobile switching center; and an extension transmission/reception determination unit configured to determine whether the base station should transmit the user data to the radio network controller or the base station should transmit the user data to another base station via the extension transmission/reception server without going through the mobile switching center, based on the connection information.

6. The mobile switching center of claim 5, wherein the extension transmission/reception determination unit determines that the base station should transmit the user data to the extension transmission/reception server when a plurality of the extension/reception servers exist and the connection information associates the base station with at least one of the extension transmission/reception servers.

7. The mobile switching center of claim 6, wherein the extension transmission/reception determination unit selects one of the extension transmission/reception servers based on traffic load or process capacity of each of the extension transmission/reception servers and determines that the base station should transmit the user data to the extension transmission/reception server selected by the extension transmission/reception determination unit when the connection information associates the base station with a plurality of extension transmission/reception servers.

* * * * *